Patented Oct. 11, 1927.

1,645,080

UNITED STATES PATENT OFFICE.

HAROLD L. WATSON, OF LYNN, MASSACHUSETTS, ASSIGNOR TO GENERAL ELECTRIC COMPANY, A CORPORATION OF NEW YORK.

METHOD OF PRODUCING HIGH-GRADE VITREOUS SILICA.

No Drawing.    Application filed June 24, 1926. Serial No. 118,391.

The present invention relates to the production of high grade, vitreous silica, that is, silica which is clear and substantially free from bubbles and cloudiness.

When even the clearest quartz crystal is subjected to fusion under ordinary conditions, the fusion upon cooling is found to contain numerous small bubbles. Apparently these bubbles are due to peculiarity of the quartz crystal in cracking or shattering before fusion occurs. When the fragments fuse, air is trapped forming bubbles and as the fusion is very sluggish or viscous, the bubbles do not escape. The word "fusion" is used here to designate a sufficient softening of the silica to permit it to flow. This occurs at about 1700° to 1800° C. At higher temperatures the fusion becomes more nearly liquid but as volatilization occurs as the temperature is raised, the removal of the bubbles in fused silica has constituted a difficult problem.

In Patent No. 1,549,597 issued to Levi B. Miller on August 11, 1925, a method of producing bubble-free silica is described whereby crystalline silica first is heated to fusion in a good vacuum and the vacuum-fusion product then is re-fused in an ordinary furnace open to the air where the fusion is subjected to pressure mechanically applied. Fusion in a vacuum prevents substantially the trapping of gas in substantial amounts within the silica when the crystalline material shatters and fuses, and the subsequent pressure step further reduces the size and number of the bubbles or cavities.

I have provided an improved method of clarifying silica, which in its special application is used in place of the pressure fusion to further refine vacuum-fused silica, and which also may be used beneficially for fusing silica not fused previously in a vacuum. In accordance with my invention silica is heated to a temperature materially higher than the temperature at which silica fuses, preferably to a temperature well above 2,000° C. until trapped gases are eliminated therefrom.

In carrying out my invention, in its preferred form, vacuum-fused silica such as produced by the method described and a vacuum furnace shown in Devers United States Patent No. 1,536,821, is packed in a suitable container, for example, in a graphite crucible, and heated to a temperature of about 2000 to 2300° C. for a short time,—say for about ten minutes. The silica preferably is surrounded by a packing material of loose, fine graphite which also should be preheated to 2000° C. to remove impurities. A resistance furnace may be employed for this purpose. For example, I may use the furnace shown in Thomson and Watson Patent No. 1,546,266 of July 14, 1925, or in the furnace described in Miller Patent No. 1,549,597 of August 11, 1925. In some cases it is preferable to use the ordinary resistance furnace, in which the heater consists of a carbon tube packed in charcoal. Although the vaporization of silica occurs at an accelerated rate when the temperature is raised above the fusion temperature, the losses due to volatilization are not increased proportionately because of the shortness of the time intervals required in the practice of my invention to eliminate bubbles. At a temperature of about 2300° C vacuum-fused silica substantially free from bubbles is produced with a loss of about 30 per cent. The fusion preferably is carried out under atmospheric pressure although fusion in a vacuum at the high temperature characteristic of my invention is permissible.

In my opinion the removal of the bubbles in the silica is due to the enhanced absorptive property of vitreous silica for gas at high temperature. In silica pre-fused in vacuo very little gas is actually trapped and in all probability the bubbles, of which the larger are about one millimeter in diameter, contain highly attenuated gas. The absorption of this gas and the lower viscosity of the silica in the superheated state causes a substantial elimination of the bubbles.

In addition to the elimination of gas by absorption, gas also escapes from the fused silica because of the greater fluidity of silica at temperatures materially above 1800° C., particularly so as the gas expands as the temperature is raised.

What I claim as new and desire to secure by Letters Patent of the United States, is:—

1. The process of producing clear, vitreous silica which consists in heating crystalline silica in a vacuum to a temperature sufficiently high to cause fusion and thereupon heating the product for a short time to a temperature above 2000° C. in the presence of a gas at substantial pressure.

2. The process of clarifying vacuum-fused silica containing trapped gas which consists in heating said silica to a temperature of about 2300° C. for a short time 3. The process of producing clear, vitreous silica which consists in heating crystalline silica in a vacuum to a temperature sufficiently high only to cause fusion and thereupon increasing the temperature materially above the fusing point at substantially atmospheric pressure.

In witness whereof, I have hereunto set my hand this 22nd day of June 1926.

HAROLD L. WATSON.